United States Patent [19]
Johnson et al.

[11] Patent Number: 4,798,861

[45] Date of Patent: Jan. 17, 1989

[54] SURFACE TREATMENT OF POLYMERS

[75] Inventors: Ian M. Johnson; Ian M. Moody; Peter Flesher, all of West Yorkshire, England

[73] Assignee: Allied Colloids Limited, England

[21] Appl. No.: 934,157

[22] Filed: Nov. 24, 1986

[30] Foreign Application Priority Data

Nov. 27, 1985 [GB] United Kingdom ................ 8529198

[51] Int. Cl.⁴ ............................ C08F 2/16; C08F 8/00
[52] U.S. Cl. .................................. 524/458; 524/460; 524/801; 524/832; 525/360; 525/362; 525/363
[58] Field of Search .............. 524/458, 460, 801, 832; 525/360, 362, 363

[56] References Cited

U.S. PATENT DOCUMENTS

| | | | |
|---|---|---|---|
| 4,021,399 | 5/1977 | Hunter et al. | 524/801 |
| 4,043,952 | 8/1977 | Ganslaw | 525/360 |
| 4,148,746 | 4/1979 | Klemmensen et al. | 524/460 |
| 4,367,323 | 1/1983 | Kitamura et al. | 524/460 |
| 4,645,568 | 2/1987 | Kurps et al. | 524/801 |

*Primary Examiner*—Joseph L. Schofer
*Assistant Examiner*—Peter D. Mulcahy
*Attorney, Agent, or Firm*—Ostrolenk, Faber, Gerb & Soffen

[57] ABSTRACT

The properties of water soluble or, especially water swellable polymer particles are improved by surface cross linking that is caused by providing a dispersion of gel polymer particles in an organic solvent, reacting the surfaces of these particles with dissolved cross linking agent and azeotropically distilling the dispersion.

9 Claims, No Drawings

SURFACE TREATMENT OF POLYMERS

It is known that polymer particles that are water soluble or water swellable can be preferentially cross linked at their surfaces by reaction of their surfaces with a cross linking agent, in order to increase the rate of water absorption or water dispersability of the particles.

In GB No. 679,716 the water dispersibility of natural soluble alginate polymers is increased by providing the surface of the particles with a screening substance. In particular an insoluble alginate is formed on the surface. For instance the alginate particles are suspended in an ethanolic solution of calcium chloride, in which they are not soluble, and warmed to a temperature of 50° C. until the alcohol has evaporated.

In U.S. Pat. No. 3,251,814 dry polyacrylamide particles, for instance made by crushing or grinding solvent-dried polyacrylamide, are slurried or otherwise contacted with a treating solution comprising lower alkanol, water and water soluble chromic salt. The treating solution is drained or filtered off and the polymer particles are then dried. In another process described in this patent, acrylamide is polymerised while in aqueous solution, chromium trichloride is added and after four hours at 60° C. the product is diluted and methanol is added to precipitate the polymer. This process however apparently cannot give the desired preferential surface cross linking since the chromium cross linking agent is present in the aqueous phase during polymerisation and so presumably the particles will have substantially uniform cross linking throughout their diameter.

In U.S. Pat. No. 4,043,952, dry particles of water-soluble and water-swellable synthetic and natural polymers are suspended in a non-solvent for the polymer containing a polyvalent metal compound. After heating for a period of time the particles are separated, e.g., by filtration or evaporation, and the particles may then be further dried. The particles are dry at the time of introduction to the non-solvent but in some of the examples the non-solvent is a blend of 10% water with methanol or ethanol or 20% water with dioxane. Metal ions that are used to cross link the surface of the particles include aluminium, chromium, zirconium, zinc, manganese, cobalt, barium and tin ions. They may be introduced in any form that is ionisable or soluble in the dispersing medium, including materials such as aluminium isopropoxide.

All these methods require the initial production of polymer particles that are dry. Since the particles, irrespective of whether they are natural or synthetic polymers, are always initially produced in the form of solutions or aqueous gels, they have to be dried, generally by thermal drying, prior to the surface cross linking and if aqueous cross linking agent is used they then have to be redried.

The known treatments can greatly improve distribution of the soluble or swellable particles when added to excess water, and known swellable particles can have satisfactory gel capacity. However the particles (especially the swellable particles) tend to absorb liquid slower than would be desired. As a result liquid, e.g., urine, may run off before it can be absorbed.

Some production methods yield gel particles having very hydrophilic surfaces but others result in the particles having slightly hydrophobic surfaces, and this further impairs the rate of water uptake. This is a particular problem when the particles are coated by a polymeric stabiliser that includes hydrophobic groups and carboxylic acid groups.

Swellable insoluble polymers are made by polymerisation of monomer in an aqueous phase containing dissolved cross linking agent. The tendency of such particles to be very soft and/or to stick to one another ("gel blocking") when they are swollen is reduced by increasing the amount of cross linking agent, but this reduces the absorptive capacity. It would be desirable to achieve high absorptive capacity in particles that remained separate from one another even when highly swollen. Reduction of interparticulate adhesion would also be desirable during the dissolution of soluble particles.

Despite the recommendations in U.S. Pat. No. 4,043,952 and in much of the prior art to treat dry polymer particles in a non-aqueous system with the surface cross linking agent, we have found that much better results are achieved when the polymer is highly swollen by the presence therein of a large amount of water during cross linking. We have found that it is possible to obtain very satisfactory improved properties, especially in cross-linked polymers, by a very economic process even when the surfaces are contaminated by hydrophobic stabiliser. In particular, in the invention we can achieve a greatly increased rate of water uptake and can also obtain a stronger gel structure without damaging the gel capacity.

In the invention, polymer particles that are water soluble or water swellable and that are cross linked at their surfaces are made by reacting the surfaces of the particles with a dissolved first cross linking agent while the particles are dispersed in an organic solvent in which they are insoluble and then separating the particles from the organic solvent, and in this process the particles are introduced into the organic solvent in the form of gel particles containing at least 40% by weight water based on water plus polymer and the particles are dried, and the cross linking reaction completed, by azeotropic distillation of the dispersion.

Thus in the invention the cross linking reaction is performed in the present of a substantial amount of water, which is introduced in the gel particles and not as a mixture with the organic solvent. This gives greatly improved results and also has the advantages that previous drying of the polymer particles is unnecessary and that the amount of water can be selected without regard to its miscibility with the organic solvent and, it also has the advantage that the organic solvent can be water immiscible. This is particularly desirable as azeotropic distillation with water immiscible solvents is much more easily effected, under safer azeotroping conditions, than with the water miscible solvents that will form azeotropes.

The water content of the gel particles is generally at least 50% by weight and often in the range 50 to 70% by weight.

It is generally necessary for the dispersion to be stabilised, during the azeotroping, by the inclusion of a dispersion stabiliser that may include an emulsifier, e.g., a fatty acid derivative, but preferably includes a polymeric stabiliser. This may be any of the amphipathic polymeric stabilisers that are suitable for stabilising polymer dispersions. Suitable materials are described in EP 0126528. They are generally copolymers of hydrophobic monomers with hydrophilic monomers, e.g., as described in that patent. The monomers may both be acrylic, e.g., $C_{8-24}$ alkyl esters of (meth) acrylic acid or N—$C_{8-24}$ alkyl acrylamides or methacrylamides copolymerised with a non-ionic, cationic or hydrophilic acrylic monomer. When the hydrophilic monomer provides carboxylic acid (or salt) groups in the polymer, particularly beneficial results can be obtained in the invention by reaction of these groups with the cross linking agent. The amount of dispersion stabiliser is typically 0.05 to 5% based on polymer particles (dry weight).

As is explained in more detail below, the gel polymer particles can be pre-formed and then combined with the organic solvent or they can be formed in situ in the organic solvent and the first cross linking agent can be present during their formation.

The polymer can be wholly naturally occurring (or modified naturally occurring) polymer such as a gum, cellulosic or carbohydrate polymer. Preferably however the polymer comprises a synthetic polymer formed from a water soluble monomer or monomer blend. It may consist of such synthetic polymer or it may comprise a blend of synthetic polymer with a naturally occurring polymer.

The dispersion of polymer in water-immiscible liquid used in the process may be the product of a process in which an aqueous solution of a polymer is dispersed into a water-immiscible liquid and the resultant dispersion is azeotroped. For example, any of the processes discussed in EP No. 0128661 may be used. Such a process is of particular use for the treatment of natural water-soluble polymers such as cellulosics or xanthan or other biopolymers. The dissolved cross linking agent may be incorporated, for example, after partial drying but before final azeotroping.

When the polymer comprises synthetic polymer formed from water soluble monomer or monomer blend by gel polymerisation, the dispersion of gel particles containing at least 40% by weight water may be produced by granulating an aqueous polymer gel and blending it with the organic solvent. For instance the monomer or monomer blend may be subjected to bulk gel polymerisation and the resultant aqueous polymer gel granulated in known manner. For instance it may be granulated by shearing or milling in a liquid medium, which may be the organic solvent, or it may be comminuted in known manner in air and the resultant particles stirred into the organic solvent. If desired the gel may be partially dried before the particles are blended with the organic solvent but it is economically wasteful, and technically undesirable, to dry the gel to a water content below the 40% or higher water content that is to prevail during the cross linking reaction.

When the polymer gel is to be made by bulk gel polymerisation, it may consist solely of synthetic polymer or it may comprise both natural and synthetic polymers. It may be the product of a graft copolymerisation process of water-soluble polymerisable monomers onto a carbohydrate or derivatives and/or it may be a physical blend (i.e. non-chemically linked) of synthetic and natural polymer, for example produced by the polymerisation of water-soluble polymerisable monomer in the presence of dissolved or swollen natural polymer, generally carbohydrate.

In particular exothermic bulk gel polymerisation may be conducted on a mixture of polymerisable monomers and ungelatinised polysaccharide, whereby the polysaccharide is gelled by the exotherm, as described in No. WO86/00315.

Synthetic polymers that are surface cross linked in the invention may be non-ionic but best results are obtained with mildly or highly anionic polymers, since the anionic groups form cross linkages with multivalent metal ions as cross linking agent.

The monomer or monomers from which the synthetic polymers are formed are usually ethylenically unsaturated, and are usually acrylic but can be other vinyl monomers or allyl monomers. They are generally water soluble although blends of water soluble and water insoluble monomers may sometimes by used, generally provided the blend is itself water soluble. The monomers are usually 5–100% anionic and 0–95% non-ionic, preferably 50–100% anionic and 0–50% non-ionic.

Anionic monomers may be free carboxylic acids or free sulphonic acids but are usually present as salts with alkali, usually sodium or potassium, or ammonia. Dicarboxylic monomers may be present as anhydrides. Suitable carboxylic acids include acrylic acid, methacrylic acid, maleic acid and itaconic acid. Suitable sulphonic acids include styrene sulphonic acid and 2-acrylamido-2-methyl propane sulphonic acid. Suitable non-ionic monomers include acrylamide, methacrylamide and N-substituted acrylamides, and hydroxy alkyl acrylates such as hydroxy ethyl acrylate or methacrylate. Particularly preferred polymers are those formed from acrylic acid (generally as sodium salt) homopolymer or copolymerised with, usually, a minor amount of acrylamide.

The polymer can be water soluble and linear (and the polymerisation is therefore conducted in the absence of a cross linking agent in the aqueous polymerisation phase). However the invention is of most value when the polymer is a cross linked insoluble but water swellable polymer as a result of including second cross linking reagent in the aqueous polymerisation mixture. This reagent must therefore be soluble in the aqueous monomer. Usually the amount of such a reagent is more than 10 ppm, often more than 50 ppm. Usually the amount is below 3000 ppm, and often below 1000 ppm. Best results are generally achieved at values of 100 to 500 ppm.

The second cross linking agents can be any of the ionic or covalent cross linking agents suitable for cross linking polymers formed from water soluble monomers, but are preferably water soluble di- or poly-ethylenically unsaturated compounds.

Examples of suitable polyfunctional compounds include divinyl compounds such as divinyl benzene and divinyl diethylene glycol diether; allyl compounds such as allyl methacrylate, allyl acrylate, diallyl phthalate and diallyl sucrose; polyfunctional acrylates and methacrylates such as glycol diacrylate, glycol dimethacrylate, pentaethritol tetra-acrylate and trimethylol propane trimethacrylate; polyfunctional acrylamides and methacrylamides such as N,N' methylene bis acrylamide; N-methylolacrylamide, poly-N-methylol acrylamide, glycidyl acrylate, glycidyl methacrylate, polyol-polyglycidal ethers such as ethylene glycol diglycidyl ether, and epichlorohydrin.

The polymerisation mixture may contain other conventional ingredients, for example initiators. Typically the initiators will be redox or thermal initiators.

Preferably the gel particles are made by reverse phase polymerisation of aqueous monomer or monomer blend in the organic solvent, which must therefore be a water immiscible solvent. Thus an aqueous solution of the monomer or monomer blend is dispersed in a continuous phase of the water immiscible liquid containing polymeric stabiliser, and the monomer is polymerised, all in conventional manner for reverse phase polymerisation processes.

Accordingly, a preferred process for making polymer particles that are water soluble or swellable and that are cross linked at their surfaces and that are formed from a water soluble monomer or monomer blend comprises forming the particles by reverse phase polymerisation, in a water immiscible solvent containing polymerisation stabiliser, of the monomer or monomer blend while dissolved in water in an amount sufficient to give at least 40% water based on water plus polymer, cross linking the surfaces of the particles while dispersed in the solvent by reaction with a dissolved first cross linking agent and drying the particles, and completing the cross linking reaction, by azeotropic distillation of the organic solvent.

When the first cross linking agent is added to the dispersion after the formation of the gel polymer particles but before the azeotroping, we find the product has much better properties than when it is added after azeotroping (i.e., after the particles are dry). Thus there is more uniform, and especially more rapid uptake, of water and less gel blocking, especially when the particles were initially cross linked.

These improvements are achieved to a much larger extent by including the first cross linking agent in the solvent during the polymerisation, especially when the polymerisation mixture also includes a water-soluble second cross linking agent in the aqueous phase. Normally the first cross linking agent is insoluble in water and is dissolved into the organic solvent before the polymerisation starts, although useful effects can also be obtained if it is added during polymerisation. Thus a preferred process comprises forming a suspension of an aqueous solution of one or more monomers including a water soluble second cross linking agent within a water immiscible solvent in which is dissolved a water insoluble first cross linking agent and that also includes a polymeric stabiliser inducing polymerisation and then azeotroping.

The resultant polymer particles can have rapid water uptake and high gel capacity but can be very much drier to the touch and very much more easily separated into individual particles, even when highly swollen, than conventional particles. This ease of separation and dry sensation is, prior to the invention, normally associated with very high levels of internal cross linking and, therefore, low gel capacity. The invention permits the dry firm gel structure to be obtained at a much higher gel capacity than previously.

The reverse phase polymerisation is normally conducted as a reverse phase suspension polymerisation to form particles typically having a dry size of at least 30 microns. It is very surprising that better results are achieved by polymerising the corresponding monomer droplets in an organic solution of the first cross linking agent than by polymerising them in an organic solvent and then adding the first cross linking agent or by incorporating both first and second cross linking agents in the monomer droplets.

Generally it is preferred for all processes that the first cross linking agent should be soluble in the organic solvent and generally it is preferred for all processes that it should be insoluble in water. However when using a natural polymer or a previously formed reverse phase or comminuted gel polymer, useful results can sometimes be achieved by, for instance, emulsifying an aqueous solution of first cross linking agent into the water immiscible liquid, since emulsification will result in the aqueous solution being imbibed by the surfaces of the polymer gel particles in the liquid. Similarly, when the organic solvent is a water miscible solvent into which pre-formed polymer is dispersed useful results can be achieved by dissolving the first cross linking agent into the water miscible solvent.

The first cross linking agent can be any compound that can be in solution in the dispersion, either dissolved in the surface layer of the water phase of the polymer gel particles or preferably, dissolved in the organic solvent phase and substantially insoluble in the aqueous phase. The first cross linking agent can be any of the covalent cross linking agents discussed above as second cross linking agents but preferably the first cross linking agent is a polyvalent metal. This may be introduced in the form of an oil soluble derivative of the metal or it may be introduced in some other form that will react with other chemical species in the dispersion, e.g., with stabiliser or emulsifier, to form a suitable oil soluble derivative. This reaction appears to be especially beneficial when the stabiliser includes anionic groups and the first cross linking agent is a polyvalent metal.

The metal must have a valency of at least 2 and preferably 3. For example the metal may comprise barium, calcium, zinc, manganese, tin, zirconium, chromium or other transition metals, but aluminium is preferred. Suitable oil soluble derivatives are organometallic compounds having sufficient hydrophobicity in the organic part moiety that they partition into the water-immiscible solvent phase. The derivatives may be selected from salts of organic acids, metal complexes, such as amine or ammonium complexes, metal alkoxides, metal alkyls and metal acetyl acetonates. Preferred examples are alkoxides having from 2 to 10 carbon atoms in the alkyl group, generally from 3 to 6 carbon atoms. Readily available compounds are propoxides and butoxides, especially isopropoxide and secondary butoxide derivatives of multivalent metals, the most preferred compound being aluminium isopropoxide alone or mixed with aluminium secondary butoxide.

The organic solvent is generally water immiscible and it must consist of or include a volatile solvent capable of forming an azeotrope with water. Usually in addition to that solvent, it will include a less volatile solvent. The components are selected from those conventionally used for reverse phase polymerisation such as aliphatic, aromatic and napthenic hydrocarbon solvents and oils e.g. mineral, diesel and vegetable oils, chlorinated hydrocarbons and aromatic or higher aliphatic esters such as fatty glycerides, dibutyl phthalate and dioctylphthalate, and mixtures of any of these. The liquids are inert non-solvents for the water-soluble or water-swellable polymer and should be non-toxic.

The dispersion that is azeotroped generally contains a stabiliser and/or water-in-oil emulsifier. Conventional water-in-oil emulsifiers such as are known to be useful in process in which water-in-oil dispersions are azeotroped may be used in the process. A stabiliser may be for instance an amphipathic polymeric stabiliser, such as the stabilisers describes in, for instance, EP No. 126528. When, as is preferred, the dispersion is initially made by reverse phase polymerisation process then the stabiliser present for this purpose will usually be satisfactory for stabilising the dispersion during the azeotroping step.

After forming the dispersion of gel particles in the organic solvent in the presence of the dissolved first cross linking agent, the dispersion may be maintained at ambient or elevated temperature to permit reaction to proceed before azeotroping starts, but this is generally unnecessary and adequate reaction normally occurs during the azeotroping and is completed by the azeotroping. Azeotroping is normally conducted at an elevated temperature of above 40° C., generally under reduced pressure. Preferably the temperature of azeotroping is between 60° and 90° C. although temperatures up to 110° C. are sometimes satisfactory.

The azeotroping should be conducted until the particles are dried, e.g., to a moisture content of about ambient, typically below 15% by weight based on polymer, and may then be separated from the organic solvent by known methods, such as filtration or centrifugation, and then dried of solvent residues.

The particle size is usually above 50 μm and often above 100 μm. It is usually below 800 μm and often below 500 μm. Average particle sizes in the range 50 to 300 μm are often preferred. The size can be selected by appropriate choice of comminution or polymerisation conditions in known manner.

In the final product, the metal ions or other first cross linking molecules remain mainly on the surface of the polymer particles although some ions may penetrate to the core of the particles. On the surface of the particles, the ions may cross link with the polymer molecules and may react with any other molecules. For example it may react with hydrophobic stabiliser molecules that are on the surface to render them less hydrophobic.

The efficiency can be optimised by recycling some or all of the water-immiscible solvent. Thus the solvent is generally recovered from the azeotroped distillate and reused in a subsequent process.

The invention is of particular value in the production of swellable, insoluble, particles that can absorb saline and so are of value as absorbents in diapers, catamenial applicances, incontinence pads and absorbent dressings. The surface treatment produces a more uniform coating than processes in which particles are sprayed, so that the whole surface is prevented from be coming sticky on contact with water or moisture. The products also have superior water-dispersibility, absorption and storage properties than particles treated by conventional slurring processes, the coating of the particular multivalent metal compound providing these superior results. In addition the process can avoid the extra drying step by using directly the product of a gel polymerisation or a reverse phase polymerisation.

Products which comprise water-soluble polymer may be flocculants, aqueous adhesives, thickeners, sizing agents, water-treatment and purification reagents, drainage and dewatering aids, etc. The process improves the dispersibility of the products into water or aqueous solutions by preventing the surfaces of the particles becoming sticky on contact with moisture and thus preventing agglomeration and lumping.

Products which comprise water-swellable polymers may be used as thickeners for aqueous solutions or dispersions or as aqueous adhesives. The process increases the rate of swelling on the addition of the particles to water, and thus the rate at which the thickening properties become effective. The improvement is again due to the prevention of stickiness on the particle surfaces.

The following examples illustrate the invention

EXAMPLE 1

180 g of a 38% solution of 75% neutralised sodium acrylate monomer containing 100 ppm methylene bisacrylamide and 37 ppm sodium sulphite was dispersed in 230 g SBP 11 oil containing 0.1% stearyl methacrylate-methacrylic acid copolymer as polymeric amphipathic stabiliser. The dispersion conditions were conventional for reverse phase polymerisation. 10 ppm tertiary butyl hydroperoxide were added to start polymerisation which was allowed to continue in conventional manner. When the polymerisation had terminated, 4% of a mixture of aluminium isopropoxide and aluminium secondary butoxide (based on the weight of dry polymer) was added as a 10% solution in SBP 11 solvent. The product was subjected to azeotropic distillation to remove water. The resultant beads were separated from the oil by centrifugation and were then dried.

EXAMPLE 2

(Comparative)

The process of Example 1 was repeated except that the aluminium isopropoxide-butoxide mixture was not added until after azeotroping was complete and the mixture was held warm to allow reaction to proceed before the centrifugation.

The gel capacity (grams saline per gram polymer) and the rate of absorption were recorded for the products of examples 1 and 2. The rate of absorption was determined by stirring 100 gm of a 0.9% NaCl aqueous solution with a paddle stirrer at a rate that gave a vortex to half the depth of the solution, adding 4 gm of the polymer and measuring the time in seconds taken for the vortex to disappear, while continuing stirring at the same rate. The lowest value indicates the quickest, and therefore best, rate of absorption.

The results are:

|  | Gel Capacity g/g | Rate of Absorption (seconds) |
| --- | --- | --- |
| Example 1 | 61 | 25 |
| Example 2 | 57.6 | 49 |

EXAMPLE 3

The method of example 1 was carried out except that the mixture of aluminium isopropoxide and aluminium secondary butoxide was added to the solvent containing the stabiliser prior to polymerisation. The polymerisation conditions were otherwise identical to example 1.

The products of examples 1 and 3 had similar gel capacity and the rate of absorption in Example 3 was also satisfactory. However the swollen particles in Example 3 were individually much drier to the touch, much firmer, and much more easily separated from one another than the particles of Example 1. The particles of Example 2 were, in this respect, much less satisfactory than those of both Examples 1 and 3.

EXAMPLE 4

A linear polymer of sodium polyacrylate can be made by conventional bulk gel polymerisation to form a rigid gel. This can be comminuted in air, dispersed into the same oil-stabiliser mix as in Example 1 and milled in a Silverson mixer. Aluminium isopropoxide can be dissolved in the oil and the dispersion then azeotroped and centrifuged as in Example 1.

I claim:

1. A process for making polymer particles that are water soluble or swellable and that are cross linked preferentially at their surfaces, the process comprising suspending aqueous droplets of water soluble ethylenically unsaturated monomer or monomer blend and dissolved water soluble cross linking agent in a water immiscible organic solvent containing dissolved solvent-soluble, polyvalent metal, cross linking agent that is soluble in the organic solvent but insoluble in water in an amount sufficient to give at least 40% water, based on the weight of water plus polymer, polymerizing the monomer or monomer blend by reverse phase suspension polymerization to form gel polymer particles the surfaces of which have been reacted with the dissolved solvent-soluble cross linking agent, and then completing the cross linking reaction and drying the particles by azeotropic distillation.

2. A process according to claim 1 in which the suspension includes a polymeric stabilizer, in which the monomer blend is 5 to 100% anionic and 0 to 90% non-ionic and in which the particles are separated from the organic liquid after azeotropic distillation.

3. A process according to claim 1 in which the organic solvent is a water immiscible solvent.

4. A process according to claim 1 in which the polymer comprises a polymer formed from a water soluble ethylenically unsaturated monomer or monomer blend and is anionic.

5. A process according to claim 1 in which the first cross linking agent is soluble in the organic liquid but is insoluble in water.

6. A process according to claim 1 in which the solvent-soluble cross linking agent is an aluminium alkoxide.

7. A process according to claim 1 in which the solvent-soluble cross linking agent comprises aluminium isopropoxide.

8. A process according to claim 1 in which the polymer is a cross linked, insoluble, swellable, polymer formed from one or more monomers comprising acrylic acid or a water soluble salt thereof and water soluble cross linking agent that is soluble in aqueous acrylic acid.

9. A process according to claim 1 in which the water immiscible solvent includes a polymeric stabiliser that includes anionic groups that react with the solvent-soluble cross linking agent during the process.

* * * * *